United States Patent Office
3,474,079
Patented Oct. 21, 1969

3,474,079
COPOLYMER COMPOSITIONS
Marvin M. Fein, Westfield, and Eugene S. Barabas, Watchung, N.J., assignors to GAF Corporation, a corporation of Delaware
No Drawing. Filed Nov. 15, 1966, Ser. No. 594,369
Int. Cl. C08f 19/00
U.S. Cl. 260—86.1      4 Claims

ABSTRACT OF THE DISCLOSURE

Copolymers of an N-vinyl lactam, such as N-vinyl pyrrolidone and a fluorinated alpha, beta unsaturated acid ester such as a C–5 fluoroacrylate $$CH_2=CHCOOCH_2(CF_2)_4H$$

are prepared.

---

This invention relates to copolymer compositions and more particularly to copolymer compositions of N-vinyl lactams and fluorinated esters of alpha, beta-unsaturated acids.

Copolymer compositions comprising N-vinyl lactams copolymerized with specific monomers are well known in the art and find application in a great many areas of use. By reason of the inherent characteristics of the N-vinyl lactams, these polymers are in general water soluble and thus are eminently suitable in such varied industrial applications as pharmaceuticals, cosmetics, textiles and lithographic uses. However, this inherent water solubility of these prior compositions has virtually precluded their use in industrial applications where water-insolubility of the resin is a prerequisite.

It is accordingly one object of this invention to provide water-insoluble copolymer compositions comprising N-vinyl lactams and a specific class of fluorinated esters of alpha, beta-unsaturated acids.

A further object of the present invention is to provide copolymer compositions of N-vinyl lactams and fluorinated esters of alpha, beta-unsaturated acids which are recovered in the form of amorphous solids.

Further objects of the present invention reside in the provision of a novel process for the production of copolymers of N-vinyl lactams and fluorinated esters of alpha, beta-unsaturated acids, particularly fluorinated acrylates and methacrylates.

Still other objects and advantages of the present invention will become apparent as the description thereof proceeds.

These and other objects and advantages of the invention are obtained by the provision of novel copolymer compositions comprising N-vinyl lactams and fluorinated esters of alpha, beta-unsaturated acids. Also, provided by the present invention is a process for producing said copolymers comprising subjecting a mixture of said N-vinyl lactams and fluorinated esters of alpha, beta-unsaturated acids to polymerization at elevated temperatures in the presence of a polymerization initiator so as to effect polymerization through the ethylenic double bond.

According to the method of the present invention, as more fully delineated hereinafter, novel copolymers of N-vinyl lactams and fluorinated esters of alpha,beta-unsaturated acids are produced under mild conditions of polymerization in good yields and conversions.

The N-vinyl lactams employed as primary reactants in forming the novel copolymers of this invention may be represented by the following general formula:

(I) 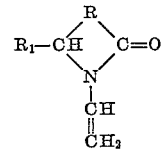

wherein R represents a divalent alkylene radical or bridge group having sufficient carbon atoms to form a five, six or seven membered heterocyclic ring system, and $R_1$ is a member selected from the group consisting of hydrogen, alkyl, aryl, alkaryl, aralkyl, etc., but preferably hydrogen. The preferred reactant falling within the above formula is N-vinyl pyrrolidone, a material well known in the art, as are the other N-vinyl lactams included by Formula I above. Other lactams covered by the above formula and useful in the present invention include 5-methyl-N-vinyl-2 - pyrrolidone, 5-ethyl-N-vinyl-2-pyrrolidone, N-vinyl-piperidone, etc.

The fluorinated alpha, beta-unsaturated acid ester monomers subjected to copolymerization with the above defined N-vinyl lactams may be represented by the following structural formula:

(II) 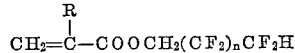

wherein R is hydrogen or an alkyl radical, preferably methyl, and $n$ is an integer. Preferred fluorinated esters falling within the above formula are those where $n$ has a value of 1 to about 13 and R is hydrogen, thus representing the class of materials known as fluorinated esters of acrylic and methacrylic acid.

These materials are produced by the reaction of an alcohol and a fluorinated hydrocarbon such as for example methanol and tetrafluoroethylene. The resulting fluorinated alcohols may be represented by the following formula:

(III)      $HOCH_2$—$(CF_2)_n$—$CF_2H$ wherein $n$ represents the values given above. This fluorinated alcohol is then reacted with the desired unsaturated acid to form the starting materials described by Formula II above.

A particularly preferred group of fluorinated alcohols and resulting esters are those wherein $n$ is an odd-numbered integer as these are the intermediates resulting from the reaction of methanol with a fluorinated hydrocarbon such as tetrafluoroethylene which material is subsequently reacted with the unsaturated acid to form the desired fluorinated starting materials.

The novel compositions produced by the polymerization reaction of the invention are high molecular weight copolymers which exist in the form of amorphous solids. The copolymers are substantially insoluble in water, aliphatic hydrocarbons and chlorinated solvents but are readily soluble in a number of other organic solvents such as alcohols, esters, ethers, ketones, aldehydes, aromatic hydrocarbons, and heterocyclic compounds.

The copolymeric products of the invention have been found to possess unexpected solubility in aromatic hydrocarbon oils and thus have important application as pour point depressants and viscosity index improvers. These materials may be employed alone or in combination or modified with other pour point depressants, viscosity index improvers, anti-oxidants and the like, as desired. Also, since the copolymeric products of the invention have limited solubility in water they may be employed as emulsions for use as cast films in forming protective coatings, impregnants and sizing agents for paper, leather and the like.

The novel copolymers of this invention can be readily and conveniently prepared by subjecting a suitable mixture of the desired N-vinyl lactam material and the fluorinated alpha, beta-unsaturated acid ester to polymerization conditions, whereby vinyl-type polymerization occurs through the ethylenically unsaturated groups. Various methods for carrying out vinyl-type polymerizations are well known in the art and include the use of various reagents for initiating the polymerization, such as the use of free-radical yielding initators and the like.

For the preparation of the copolymers of this invention, it is preferred that the fluorinated esters be introduced into the reaction system along with an N-vinyl lactam, such as N-vinyl pyrrolidone, and that the reaction be carried out by dissolving or dispersing the reactants in an aqueous solution of a desired concentration and in the presence of the initiating material for the polymerization.

Of the free-radical producing initiating systems which may be employed, there may be mentioned the per compounds, such as organic and inorganic peroxides, for example, benzoyl peroxide, cumene, hydroperoxide, hydrogen peroxide, di-tertiary-butyl peroxide, lauroyl peroxide, persulfates, including sodium and potassium persulfate, ammonium persulfate and the like. Also, perborates such as sodium, potassium and ammonium perborates can be used, as well as azo compounds such as alpha, alpha-azodiiso butyronitrile. If desired, mixtures of these initiators can be employed. The initator concentration employed in the reaction system is not necessarily a critical feature of the invention and thus can be varied over a wide range. Advantageously, however, an amount of initator from about .01 to 5.0 weight percent or more can be employed based on the total weight of the reactants being polymerized.

The ratios of each of the above primary reactants employed in the process may be varied over a wide range in order to obtain copolymer products of varied properties. Thus the N-vinyl lactam and fluorinated ester may be employed in ratios of from about 1 to 99 percent by weight of the N-vinyl lactam with correspondingly from about 99 to about 1 percent by weight of the fluorinated esters. Hence, the ratio of each of the reactants is not necessarily critical to the attainment of the objects of the invention.

Temperatures at which the reaction may advantageously be carried out can be varied from a range of about 50° C. or lower to about 100° C. or higher, depending on the reactants. However, it is preferred to conduct the polymerization reaction at about 60° C. to 70° C. in order to avoid unduly violent reactions. The reaction is normally carried out in a reaction vessel under a blanket of an inert gas such as nitrogen, argon and the like and preferably conducted at atmospheric pressure. Additionally it has been found necessary that the polymerization be conducted in the essential absence of free oxygen in order to provide optimum conditions for the polymerization reaction to occur.

If desired, an activating agent, such as an alkali metal sulfite or bisulfite, for example, sodium, potassium, etc. can be added to the polymerization mixture in about the same amount as the polymerization catalyst, in which case lower polymerization temperatures can be employed.

Additionally chain regulators such as hexyl, cetyl, dodecyl, myristyl, etc., mercaptans may be employed in the reactions.

Furthermore, suitable surface active agents may be added to the mixture in order to facilitate solubilization of the acrylate ester. These include fatty acid soaps, fatty alcohol sulfates such as sodium lauryl sulfate, potassium lauryl sulfate, etc., alkali metal salts of armoatic sulfonic acids, for example, sodium isobutylnaphthalene sulfonate, phosphate esters of polyethoxy alkyl phenols, sulfosuccinic esters, etc.

Small amounts of other monoethylenically unsaturated monomers may be copolymerized with the mixture in order to add further properties. such as cross-linking or quaternizable sites.

The following examples will serve to illustrate the best mode of carrying out the reaction of this invention.

EXAMPLE I

Into a 500 ml. flask equipped with mechanical stirrer, reflux condenser, dropping funnel, gas inlet tube and thermometer, there was introduced 0.7 parts of ammonium persulfate dissolved in 60 parts of water. Thereafter, 140 parts of methanol was added and the system purged thoroughly with nitrogen while stirring. Then a mixture of 22 parts of N-vinyl-2-pyrrolidone and 57.2 parts of a C-5 fluoroacrylate $[CH_2=CHCOOCH_2(CF_2)_4H]$ was added as a single batch. The temperature was then raised to 60° C. and the mixture was allowed to react at this temperature for three hours. During the progress of the reaction the polymeric product separated from the solution in the form of a white rubbery solid. After cooling and separation of the product an analysis yielded:

| Residual monomer: | Percent |
|---|---|
| N-vinyl pyrrolidone | 0.3 |
| Polyfluoroacrylate | 0.15 |
| Conversion | 98.2 |

EXAMPLE II

Into a one-liter resin kettle equipped with a reflux condenser, mechanical stirrer, gas inlet tube, dropping funnel, and thermometer, was placed one part ammonium persulfate dissolved in 60 parts of distilled water. Then 140 parts of methanol was added and the system was purged with nitrogen. Thereafter, a mixture of 25 parts of N-vinyl-2-pyrrolidone and 50 parts of C-9 fluoroacrylate $[CH_2=CHCOOCH_2(CF_2)_7CF_2H]$ was introduced as a single batch. The temperature of this mixture was then raised to 60° C. and the reaction allowed to proceed while stirring for three hours. During the course of the reaction the polymer formed separated from the solution in the form of a white rubbery mass. On cooling, analysis of the recovered product was as follows:

| Residual monomer: | Percent |
|---|---|
| N-vinyl pyrrolidone | 0.32 |
| Polyfluoroacrylate | 0.23 |
| Conversion | 98.2 |

In a similar manner, other N-vinyl lactams and fluorinated esters of the classes described hereinabove can be employed as described in these examples with similar results.

Reference in the specification and claims to parts, proportions and percentages unless otherwise specified, refer to parts, proportions and percentages by weight.

It is obvious that numerous changes and modifications can be made in the above-described specific embodiments without departing from the spirit and nature of the invention. Therefore, it is to be understood that all such changes and modifications are included within the scope of the invention and the invention is not to be considered as limited except as set forth in the appended claims.

What is claimed is:
1. A copolymer composition comprising (a) an N-vinyl lactam corresponding to the formula:

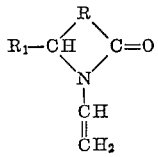

wherein R represents a divalent alkylene bridge having sufficient carbon atoms to form a five, six or seven member heterocyclic ring system and $R_1$ is a member selected from the group consisting of hydrogen and lower alkyl and (b) a fluorinated ester of the alpha, beta- unsaturated acid corresponding to the formula:

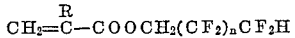

wherein R is selected from the group consisting of hydrogen and methyl and $n$ is an integer of from 1 to about 13, polymerization in said copolymer occurring through the ethylenically unsaturated groups.

2. A copolymer composition according to claim 1 wherein $n$ is an odd-numbered integer.
3. A copolymer composition according to claim 1 wherein the polymeric N-vinyl lactam is N-vinyl pyrrolidone.
4. A copolymer composition according to claim 1 wherein the N-vinyl lactam is N-vinyl pyrrolidone and the fluorinated ester is a fluorinated acrylic acid ester.

References Cited
UNITED STATES PATENTS

| | | |
|---|---|---|
| 2,982,762 | 5/1961 | Voeks et al. _____ 260—86.1 |
| 3,025,279 | 3/1962 | Barr _____ 260—86.1 |
| 3,285,888 | 11/1966 | Brown et al. _____ 260—86.1 |
| 3,350,366 | 10/1967 | Merijan _____ 260—86.1 |
| 3,386,977 | 6/1968 | Kleiner _____ 260—86.1 |
| 3,393,186 | 7/1968 | Groves _____ 260—86.1 |

HARRY WONG, JR., Primary Examiner

U.S. Cl. X.R.

117—142, 155; 252—50, 51; 260—29.6, 30.2, 31.2, 32.8, 33.2, 33.4, 33.6